(12) United States Patent
Tsuchiya et al.

(10) Patent No.: US 9,518,204 B2
(45) Date of Patent: *Dec. 13, 2016

(54) HFO REFRIGERANT COMPOSITION HAVING IMPROVED SLIDABILITY

(71) Applicant: DAIKIN INDUSTRIES, LTD., Osaka (JP)

(72) Inventors: Tatsumi Tsuchiya, Osaka (JP); Takashi Shibanuma, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 23 days.

This patent is subject to a terminal disclaimer.

(21) Appl. No.: 14/611,438

(22) Filed: Feb. 2, 2015

(65) Prior Publication Data

US 2015/0184050 A1 Jul. 2, 2015

Related U.S. Application Data

(62) Division of application No. 13/884,297, filed as application No. PCT/JP2011/078003 on Nov. 29, 2011, now Pat. No. 8,980,119.

(60) Provisional application No. 61/417,972, filed on Nov. 30, 2010.

(51) Int. Cl.
  *C09K 5/04* (2006.01)
  *C10M 171/00* (2006.01)

(52) U.S. Cl.
  CPC .......... *C09K 5/045* (2013.01); *C10M 171/008* (2013.01); *C09K 2205/11* (2013.01); *C09K 2205/126* (2013.01); *C09K 2205/22* (2013.01); *C09K 2205/40* (2013.01); *C10M 2203/06* (2013.01); *C10M 2207/283* (2013.01); *C10M 2209/04* (2013.01); *C10M 2209/103* (2013.01); *C10M 2213/02* (2013.01); *C10N 2220/021* (2013.01); *C10N 2220/302* (2013.01); *C10N 2230/02* (2013.01); *C10N 2230/06* (2013.01); *C10N 2240/30* (2013.01)

(58) Field of Classification Search
  CPC .......... C10M 171/008; C10M 2203/06; C10M 2207/283; C10M 2209/04; C10M 2209/103
  USPC .......................................................... 252/68
  See application file for complete search history.

(56) References Cited

U.S. PATENT DOCUMENTS

| 4,944,890 A | 7/1990 | Deeb et al. |
| 5,928,557 A | 7/1999 | Sanders et al. |
| 2010/0147016 A1 | 6/2010 | Kaneko et al. |
| 2012/0004299 A1 | 1/2012 | Hulse et al. |

OTHER PUBLICATIONS

International Search Report and Written Opinion issued Apr. 17, 2012 in International PCT Application No. PCT/JP2011/078003.

*Primary Examiner* — John Hardee
(74) *Attorney, Agent, or Firm* — Wenderoth, Lind & Ponack, L.L.P.

(57) ABSTRACT

The present invention provides a highly stable HFO refrigerant composition for use in a vapor compression-type refrigeration system, having improved slidability for the sliding portions of the vapor compression-type refrigeration system. More specifically, the present invention provides an HFO refrigerant composition comprising at least one type of HFO refrigerant and a polymer of halogenated propene represented by $C_3H_aF_bCl_c$ (provided that $a+b+c=6$, a=an integer of 1 to 3, b=an integer of 3 to 5, and c=an integer of 0 to 1) that is an oligomer having a molecular weight of 200 to 900.

5 Claims, No Drawings

HFO REFRIGERANT COMPOSITION HAVING IMPROVED SLIDABILITY

This is a divisional of U.S. application Ser. No. 13/884,297, filed May 9, 2013, now U.S. Pat. No. 8,980,119, which is a 371 of PCT/JP2011/078003, filed Nov. 29, 2011, which claims the benefit of U.S. Provisional Application 61/417,972, filed Nov. 30, 2010.

TECHNICAL FIELD

The present invention relates to an HFO (hydrofluoroolefin) refrigerant composition for use in a vapor compression-type refrigeration system, having improved slidability for the sliding portions of the vapor compression-type refrigeration system.

BACKGROUND ART

Chlorofluorohydrocarbons (CFCs) and hydrochlorofluorocarbons (HCFCs) have been used as refrigerants in refrigerating systems and as heating media in heat pumps. Chlorofluorocarbon (CFC) and hydrochlorofluorocarbon (HCFC) alone, or as azeotropic compositions or mixtures thereof, etc., are collectively called Freon or Freons. In recent years, it has been indicated that Freons released into the atmosphere deplete the ozone layer, thereby inflicting a serious adverse influence on the ecosystem, including humans on earth. Accordingly, the use and production of chlorofluorocarbons that pose a high risk of ozone layer depletion have been restricted under international agreements.

More specifically, dichlorodifluoromethane (CFC-12), mainly used as a refrigerant for domestic refrigerators, car air conditioners, turbo freezers, and container freezers, has been replaced by 1,1,1,2-tetrafluoroethane (HFC-134a) in compliance with the above-mentioned regulations.

However, stricter regulations have been implemented. For example, in the EU, two regulations, the "Regulation on Certain Fluorinated Greenhouse Gases," and the "Directive Relating to Emissions of F-Gas from Air Conditioning Systems Fitted to Cars" (F-gas regulations), were announced in June, 2006. According to these regulations, mobile-type air conditioners (car air conditioners) installed in new vehicles sold on the market after 2011, and those in all vehicles sold after 2017 must be configured to use a refrigerant having a global warming potential (GWP) of not more than 150. HFO-1234yf, which is a refrigerant having a low GWP, is the most prominent replacement refrigerant.

Therefore, in other applications for refrigerants as well, such as stationary air conditioners, there is a desire to develop a refrigerant with a low GWP that achieves performance equivalent to or better than currently used refrigerants in terms of energy efficiency, refrigerant characteristics (e.g., refrigeration capacity, boiling point, pressure and incombustible), etc., in LCCP (Life Cycle Climate Performance) evaluation; and that requires no or only slight modification of equipment.

Examples of known replacement refrigerants include 1,2,3,3,3-pentafluoro-1-propene (HFO-1225ye), 2,3,3,3-tetrafluoro-1-propene (HFO-1234yf), and like HFO (hydrofluoroolefin) refrigerants, which are compounds having a low GWP and an unsaturated bond in the molecule.

To a composition comprising a conventional HFC refrigerant and a lubricant, a phosphoric acid-based extreme-pressure additive or the like is added in order to improve the slidability.

However, it turned out that when a phosphoric acid-based extreme-pressure additive such as used in conventional refrigerants (R410A, etc.) and an HFO refrigerant are combined, the additive is consumed and the acid value of the composition is increased depending on the testing conditions (e.g., the coexistence of air).

The decomposition mechanism is probably such that oxygen reacts with the double bond of the HFO refrigerant to generate an acid content, and the acid content thus generated reacts with the phosphoric acid-based additive.

Accordingly, there is a desire to develop an additive that can be used in HFO refrigerants to improve the slidability of the refrigerant and that can prevent or suppress these reactions (the reaction of the decomposition product of the HFO refrigerant with the additive, etc.).

SUMMARY OF INVENTION

Technical Problem

An object of the present invention is to provide an HFO refrigerant composition for use in a vapor compression-type refrigeration system, by which the slidability in the sliding portions of the vapor compression-type refrigeration system are improved, the HFO refrigerant composition being highly stable.

Solution to Problem

To achieve the above objects, the present inventors carried out extensive research. As a result, the inventors found that the above objects can be achieved by using a specific oligomer as an additive. The present invention has been accomplished based on this finding.

More specifically, the present invention relates to the HFO refrigerant composition described below.

Item 1. An HFO refrigerant composition comprising at least one type of HFO refrigerant and a polymer of halogenated propene represented by $C_3H_aF_bCl_c$ (provided that a+b+c=6, a=an integer of 1 to 3, b=an integer of 3 to 5, and c=an integer of 0 to 1) that is an oligomer having a molecular weight of 200 to 900.

Item 2. The HFO refrigerant composition according to Item 1, wherein the HFO refrigerant is at least one member selected from the group consisting of 2,3,3,3-tetrafluoropropene (HFO-1234yf), (Z or E-)1,3,3,3-tetrafluoropropene (HFO-1234ze), (Z or E-)1,2,3,3,3-pentafluoropropene (HFO-1225ye), 1,1,3,3,3-pentafluoropropene (HFO-1225zc), and (Z or E)3,3,3-trifluoropropene (HFO-1243zf).

Item 3. The HFO refrigerant composition according to Item 1 comprising the oligomer in an amount of 0.1 to 10 parts by weight per 100 parts by weight of the HFO refrigerant.

Item 4. The HFO refrigerant composition according to Item 1 further comprising a lubricant.

Item 5. The HFO refrigerant composition according to Item 4, wherein the lubricant is at least one member selected from the group consisting of polyalkylene glycols, polyol esters, polyvinyl ethers, and alkylbenzenes, having a kinematic viscosity at 40° C. of 5 to 400 cSt.

Item 6. The HFO refrigerant composition according to Item 1, wherein the HFO refrigerant composition is used for at least one member selected from the group consisting of mobile air conditioners, refrigerators, turbo freezers, container freezers, household air conditioners, and industrial air conditioners.

The HFO refrigerant composition of the present invention is explained below.

One of the major features of the HFO refrigerant composition of the present invention is that it comprises at least one type of HFO refrigerant, and a polymer of halogenated propene represented by $C_3H_aF_bCl_c$ (provided that a+b+c=6, a=an integer of 1 to 3, b=an integer of 3 to 5, and c=an integer of 0 to 1) that is an oligomer having a molecular weight of 200 to 900.

The HFO refrigerant composition of the present invention comprises a specific oligomer; therefore, when it is used in a vapor compression-type refrigeration system, slidability is improved in hot sliding portions, thus reducing polymer and pyrolysate generation and resulting in high stability. The above effects can presumably be achieved because the oligomer has properties similar to those of fluorine oil (e.g., having a low surface tension), and the oligomer is compatible with the HFO refrigerant and lubricant. The vapor compression-type refrigeration system is at least one member selected from the group consisting of mobile air conditioners, refrigerators, turbo freezers, container freezers, household air conditioners, and industrial air conditioners.

Examples of said at least one HFO refrigerant include 2,3,3,3-tetrafluoropropene (HFO-1234yf), (Z or E-)1,3,3,3-tetrafluoropropene (HFO-1234ze), (Z or E-)1,2,3,3,3-pentafluoropropene (HFO-1225ye), 1,1,3,3,3-pentafluoropropene (HFO-1225zc), and 3,3,3-trifluoropropene (HFO-1243zf). These HFO refrigerants may be used singly or in a combination of two or more.

In addition to the HFO refrigerant, the HFO refrigerant composition of the present invention may further comprise conventional HFC refrigerants in such an extent that does not adversely affect the effects of the present invention. The content of the HFC refrigerant is preferably 60 wt % or less, and more preferably 30 wt % or less, and particularly preferably 20 wt % or less per total weight of the refrigerant.

Examples of the HFC refrigerant include HFC41, HFC32, HFC125, HFC134a, HFC143a, HFC152a, HFC161, HFC245fa, and HFC227ea.

The HFO refrigerant composition of the present invention may contain a lubricant, in addition to an HFO refrigerant, depending on its application. The lubricant may be a known lubricant. Examples of usable lubricants include polyoxyalkylene glycols, polyvinyl ethers, polyphenylethers, poly(oxy)alkylene glycols or copolymers of a poly(oxy)alkylene glycol monoether and a polyvinyl ether, polyol esters, polycarbonates, silicone, polysiloxane, perfluoroethers, mineral oils, olefin polymers, alkyldiphenylalkanes, alkylnaphthalenes, and alkylbenzenes. Among such lubricants, at least one member selected from the group consisting of polyalkylene glycols, polyol esters, polyvinyl ethers, and alkylbenzenes is particularly preferable.

Such lubricants may be used singly or in a combination of two or more. The lubricant has a kinematic viscosity at 40° C. of preferably 5 to 400 cSt, and more preferably 30 to 400 cSt.

When a lubricant is used, the amount of the HFO refrigerant is typically 1 to 5 parts by weight, per 1 part by weight of the lubricant. However, the amount of the HFO refrigerant is not particularly limited to this range, and may vary depending on the specifications of the oil tank of the refrigeration system.

A polymer of halogenated propene represented by $C_3H_aF_bCl_c$ (provided that a+b+c=6, a=an integer of 1 to 3, b=an integer of 3 to 5, and c=an integer of 0 to 1) that is an oligomer having a molecular weight of 200 to 900 is used as the oligomer (additive).

For example, when HFO-1234yf is used as a monomer, the structure of the oligomer is shown below. The polymer represented by Chemical Formula 1 below is an oligomer having a molecular weight of 200 to 900.

[Chem. 1]

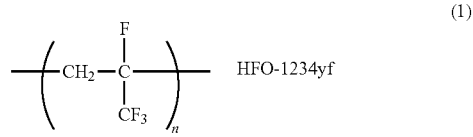

(1)

The oligomer used in the present invention has a molecular weight of generally 200 to 900, and preferably 300 to 700. When the oligomer has a molecular weight of less than 200, the oligomer has an unduly low viscosity; therefore, it is difficult to improve the slidability. In contrast, when the oligomer has a molecular weight exceeding 900, the oligomer is insoluble in the lubricant and may cause blocking of thin tubes such as capillary tubes. Therefore, the use of an oligomer having a molecular weight of 200 to 900 is preferable.

The oligomer may be prepared by polymerizing a raw material halogenated propene in a known method in such a manner that the resulting oligomer has the predetermined molecular weight.

The content of the oligomer relative to the HFO refrigerant is not particularly limited. The oligomer content is preferably 0.1 to 10 parts by weight per 100 parts by weight of the HFO refrigerant.

When the oligomer content exceeds 10 parts by weight, not only can there be no effect achieved by the amount exceeding 10 parts by weight, but when a lubricant is used in combination, it may adversely affect the viscosity of the lubricant and impair the properties thereof. It also may cause blocking of thin tubes such as capillary tubes due to the insoluble substance formed by the additionally polymerized oligomer. Therefore, a polymerization retarder may be added insofar as the effects of the present invention are not adversely affected.

Examples of the polymerization retarder include hydroquinone, dialkylhydroquinone, dialkylhydroxytoluene, terpenes, phenothiazin, and benzoquinone.

Advantageous Effects of Invention

The HFO refrigerant composition of the present invention comprises a specific oligomer; therefore, when it is used in a vapor compression-type refrigeration system, slidability is improved in hot sliding portions, thus reducing polymer and pyrolysate generation and resulting in high stability. The above effects can presumably be achieved because the oligomer has properties similar to those of fluorine oil (e.g., having a low surface tension), and the oligomer is compatible with the HFO refrigerant and lubricant.

DESCRIPTION OF EMBODIMENTS

The present invention is described below in more detail with reference to Examples and Comparative Examples.
Preparation of Oligomer 50 g of HFO-1234yf ($CF_3CF=CH_2$) was sealed in a 500-cc autoclave made of SUS. The autoclave was dipped in liquid nitrogen to solidify the HFO-1234yf, and the noncondensable gas (air) in the container was removed using a vacuum pump (i.e., deaerated).

After the deaeration, the autoclave was returned to room temperature, and then heated at 220° C. for 20 days in a thermostat.

After the completion of heating, the autoclave was cooled to room temperature to remove the HFO-1234yf in the form of a gas from the gas phase portion.

After the gas was removed to such an extent that the inside of the autoclave reached atmospheric pressure, 7.5 g of residual liquid (oligomer) remaining in the autoclave was collected.

The molecular weight of the oligomer was measured using the equipment and method described below.

Measurement of Number Average Molecular Weight by Gel Permeation Chromatography

The measurement was performed by employing gel permeation chromatography (GPC), using an HLC-8020 (GPC apparatus) manufactured by Tosoh Corporation and Shodex columns (GPC KF-801×1, GPC KF-802×1, and GPC KF-806M×2 connected in series). The number average molecular weight was calculated based on the data obtained by using tetrahydrofuran (THF) as a solvent (at 40° C., flow rate of 1 mL/min). The molecular weight was calibrated using standard polystyrene.

The molecular weight of the HFO-1234yf oligomer (O) was found to be 520.

Examples 1 and 2 and Comparative Examples 1 to 3

The following compounds X to Z were prepared as refrigerants. The oligomer (O) was that prepared above.

X: HFO-1234yf ($CF_3CF=CH_2$)

Y: HFC-32 ($CF_2CH_2$)

Z: R410A (conventional refrigerant)

O: HFO-1234yf oligomer

A: FVC68D (containing an extreme-pressure additive) manufactured by Idemitsu Kosan Co., Ltd. was prepared as a lubricant mainly consisting of a polyvinyl ether compound having a constitutional unit represented by Formula (i) below and having a kinematic viscosity at 40° C. of about 70 cst.

B: A lubricant that did not contain an extreme-pressure additive was prepared as a base oil (the oil had the same constitutional unit and kinematic viscosity as A above).

[Chem. 2]

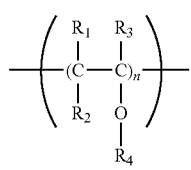

Formula (i)

The refrigerant composition formulations of the Examples and Comparative Examples are shown in Table 1 below. Each component was mixed to obtain a refrigerant composition.

TABLE 1

| | Refrigerant | | | Oligomer | Lubricant | |
|---|---|---|---|---|---|---|
| | X | Y | Z | O | A | B |
| Comparative Example 1 | 100 | | | | 100 | |
| Comparative Example 2 | 50 | 50 | | | 100 | |
| Comparative Example 3 | | | 100 | | 100 | |
| Example 1 | 100 | | | 3 | | 100 |
| Example 2 | 50 | 50 | | 3 | | 100 |

The numerical values in Table 1 are parts by weight.

Test Example 1

Measurement of Load-Carrying Properties

This measurement was performed in accordance with the Falex test method based on ASTM D3233. Specifically, a rotating steel journal was compressed between two stationary V-blocks with the compressed part immersed in the refrigerant composition prepared above. The rotation speed of the rotating steel journal was adjusted to 290±10 rpm, and the block-compression load was increased until the rotating steel journal broke. The load at the point of breaking was determined to be the minimum load-carrying property, and the results were evaluated into 3 levels, a to c.

Measurement of Abrasion Powder Amount

This measurement was performed in accordance with the Falex testing method based on ASTM D3233. Specifically, a rotating steel journal was compressed between two stationary V-blocks with the compressed part immersed in the refrigerant composition prepared above. The rotation speed of the rotating steel journal was adjusted to 290±10 rpm, and the block-compression load was adjusted to 200 lb for a one-minute running in period. Thereafter, the test apparatus was operated for 10 minutes under a 1,000-lb load. The amount of abrasion powder formed from the rotating steel journal was measured and evaluated into 3 levels, a to c.

Common criteria for the evaluation of the minimum load-carrying measurement and abrasion powder amount measurement are shown below.

Level a: Similar or slightly superior to the slidability of the standard (R410A)

Level b: Slightly inferior to the standard

Level c: Significantly inferior to the standard, requiring measures to be taken

TABLE 2

| | Minimum load-carrying capacity | Abrasion powder amount |
|---|---|---|
| Comparative Example 1 | b | c |
| Comparative Example 2 | b | b |
| Comparative Example 3 | Standard | Standard |
| Example 1 | a | a |
| Example 2 | a | a |

Comparative Examples 1 to 3

The refrigerant of Comparative Example 3 was the standard (R410A), and exhibited no problems in slidability.

Comparative Examples 1 and 2, in which only HFO-1234yf, and a mixed refrigerant of HFO-1234yf and HFC32 were used, respectively, exhibited lower minimum load-carrying values than Comparative Example 3, but it was not a problematic level.

However, Comparative Example 1 exhibited an abrasion powder amount that required some improvement.

Examples 1 and 2

The test results of Examples 1 and 2, in which the aforementioned oligomer was used instead of the extreme-pressure additive for conventional refrigerant lubricants, show that the minimum load-carrying capacity was improved by about 5 to 10% and the abrasion powder amount was decreased.

These results indicate that by adding the oligomer described above to a composition comprising an HFO refrigerant and a lubricant, the slidability (lubricity) of the same level as the conventional refrigerant composition (R410A+extreme-pressure additive-containing lubricant) or a slightly improved level were obtained.

The invention claimed is:

1. A method of improving slidability in a member selected from the group consisting of mobile air conditioners, refrigerators, turbo freezers, container freezers, household air conditioners, and industrial air conditions, comprising combining an HFO refrigerant composition comprising at least one type of HFO refrigerant and a polymer of halogenated propene represented by $C_3H_aF_bCl_c$ (provided that a+b+c=6, a=an integer of 1 to 3, b=an integer of 3 to 5, and c=an integer of 0 to 1) that is an oligomer having a molecular weight of 200 to 900 with the member described above.

2. The method according to claim 1, wherein the HFO refrigerant is at least one member selected from the group consisting of 2,3,3,3-tetrafluoropropene (HFO-1234yf), (Z or E-)1,3,3,3-tetrafluoropropene (HFO-1234ze), (Z or E-) 1,2,3,3,3-pentafluoropropene (HFO-1225ye), 1,1,3,3,3-pentafluoropropene (HFO-1225zc), and 3,3,3-trifluoropropene (HFO-1243zf).

3. The method according to claim 1 comprising the oligomer in an amount of 0.1 to 10 parts by weight per 100 parts by weight of the HFO refrigerant.

4. The method according to claim 1 further comprising a lubricant.

5. The method according to claim 4, wherein the lubricant is at least one member selected from the group consisting of polyalkylene glycols, polyol esters, polyvinyl ethers, and alkylbenzenes, having a kinematic viscosity at 40° C. of 5 to 400 cSt.

* * * * *